US009127688B2

(12) United States Patent
Chou

(10) Patent No.: US 9,127,688 B2
(45) Date of Patent: Sep. 8, 2015

(54) FAN AND BEARING COOLING STRUCTURE THEREOF

(71) Applicant: ASIA VITAL COMPONENTS CO., LTD., Sinjhuang District, New Taipei (TW)

(72) Inventor: Chu-Hsien Chou, New Taipei (TW)

(73) Assignee: Asia Vital Components Co., Ltd., New Taipei (TW)

( * ) Notice: Subject to any disclaimer, the term of this patent is extended or adjusted under 35 U.S.C. 154(b) by 290 days.

(21) Appl. No.: 13/657,871

(22) Filed: Oct. 23, 2012

(65) Prior Publication Data

US 2014/0112810 A1    Apr. 24, 2014

(51) Int. Cl.

| F04D 25/08 | (2006.01) |
|---|---|
| F04D 29/056 | (2006.01) |
| F04D 29/58 | (2006.01) |
| F04D 25/06 | (2006.01) |
| F16C 37/00 | (2006.01) |
| F16C 17/02 | (2006.01) |

(52) U.S. Cl.
CPC ............ *F04D 25/062* (2013.01); *F04D 29/584* (2013.01); *F16C 17/02* (2013.01); *F16C 37/00* (2013.01)

(58) Field of Classification Search
CPC ....... F04D 29/584; F04D 17/16; F04D 25/08; F04D 25/0613; F04D 25/062; F04D 29/563; F04D 29/059; F04D 29/057; F04D 29/046; F04D 29/0462; F04D 29/047; F04D 29/049; F04D 25/06; F04D 13/0673; F04D 13/06; H02K 5/163; H02K 5/1735; H02K 5/16; H02K 5/173

See application file for complete search history.

(56) References Cited

U.S. PATENT DOCUMENTS

| 6,544,011 B2 * | 4/2003 | Hsieh .......................... 417/423.7 |
| 7,656,066 B2 * | 2/2010 | Serowy et al. ................... 310/90 |
| 2006/0153677 A1 * | 7/2006 | Winkler et al. ............... 415/220 |

* cited by examiner

*Primary Examiner* — Bryan Lettman
(74) *Attorney, Agent, or Firm* — C. G. Mersereau; Nikolai & Mersereau, P.A.

(57) ABSTRACT

A bearing cooling structure includes a metal base seat and a plastic bearing cup. The metal base seat has a raised section and an extension section. The plastic bearing cup encloses the raised section and has an inner circumference defining a bearing hole. The extension section horizontally extends from the raised section toward a center of the plastic bearing cup. The extension section has a free end and an upper surface positioned in the bearing hole. A bearing is received in the bearing hole and disposed on the extension section. A bottom face of the bearing is in contact with the upper surface of the extension section. Accordingly, the heat of the bearing can be transferred (conducted) through the extension section to the metal base seat to be dissipated. A fan with the bearing cooling structure is also disclosed.

18 Claims, 11 Drawing Sheets

FAN AND BEARING COOLING STRUCTURE THEREOF

BACKGROUND OF THE INVENTION

1. Field of the Invention

The present invention relates generally to a heat dissipation structure, and more particularly to a bearing cooling structure and a fan with the bearing cooling structure.

2. Description of the Related Art

The bearing of a conventional fan is often fixed in several manners as follows:

1. A prior art discloses a metal bearing cup fan motor fixing structure. The fan includes a frame body, a circuit board disposed on the frame body, a stator assembly fixed on the frame body and a rotor assembly shafted around the stator assembly. A rest seat is disposed at the center of the frame body. A bearing sleeve is disposed on the rest seat. The bearing sleeve is composed of a fitting section and a hollow tubular body. More than one connection section is disposed on the outer circumference of the fitting section. A lower winding support is fixedly disposed under the bottom of the stator assembly. The lower winding support is formed with a central through hole. More than one engagement section is disposed on the inner circumference of the through hole. The engagement sections are correspondingly engaged with the connection sections of the bearing sleeve. Accordingly, the stator assembly can be securely disposed on the bearing sleeve of the rest seat by means of the lower winding support. Even after a long period of use, the stator assembly is still prevented from loosening or detaching under external force. Therefore, the operation of the fan will not be affected.

2. A prior art discloses a nonmetal bearing cup fan motor fixing structure. The fan includes a frame body, a circuit board disposed on the frame body, a stator assembly fixed on the frame body and a rotor assembly shafted around the stator assembly. A rest seat is disposed at the center of the frame body. A bearing sleeve is disposed on the rest seat. The bearing sleeve is composed of a fitting section and a hollow tubular body. The fitting section integrally protrudes from the center of the rest seat. More than one connection section is disposed on the outer circumference of the fitting section. More than one rib is disposed on the outer circumference of the hollow tubular body. A lower winding support is fixedly disposed under the bottom of the stator assembly. The lower winding support is formed with a central through hole. More than one engagement section is disposed on the inner circumference of the through hole. The engagement sections are correspondingly engaged with the connection sections of the bearing sleeve. Accordingly, the stator assembly can be securely disposed on the bearing sleeve of the rest seat by means of the lower winding support. Even after a long period of use, the stator assembly is still prevented from loosening or detaching under external force. Therefore, the operation of the fan will not be affected.

3. A prior art discloses a fan bearing cup structure including fan frame having a rest section at the center. A bearing cup is disposed on the rest section. More than one engagement unit is disposed on outer circumference of the bearing cup in proper position. A motor unit having a central through hole is fitted around the bearing cup. The inner wall face of the through hole are formed with recesses for correspondingly engaging with the engagement unit. A fan impeller unit is composed of a hub, a shaft, blades and magnetic bodies. The shaft is disposed at the center of the hub and fitted in the bearing cup. The magnetic bodies are disposed on inner circumference of the hub corresponding to the motor unit. Accordingly, the motor unit can be securely disposed on the bearing cup without leftward or rightward loosening or rotating or displacing or upward detaching from the bearing cup.

4. A prior art discloses a motor including a sleeve, a stator seat and a rotor structure. At least one first connection section is disposed at top end of the sleeve. The stator seat has a lining formed with a central hole. The sleeve is fitted in the central hole of the stator seat. At least one second connection section is disposed on the circumference of the central hole of the lining of the stator seat corresponding to the first connection section of the sleeve. The second connection section is connected with the first connection section by means of thermal welding. The rotor structure has a rotary shaft disposed in the sleeve.

The above conventional bearing fixing techniques can be substantially classified into plastic injection molding and metal press. With respect to metal press, the metal has higher heat conductivity so that the heat of the bearing can be dissipated at higher efficiency to more quickly lower the temperature of the bearing. However, the cost for such measure is higher. On the other hand, the cost for the plastic injection molding is lower. However, the plastic can hardly effectively conduct the heat of the bearing to outer side so that the heat dissipation effect is poor. As a result, the temperature of the bearing may rise to deteriorate the performance.

It is therefore tried by the applicant to provide a bearing cooling structure, which not only is manufactured at lower cost, but also is able to efficiently conduct the heat of the bearing to outer side.

SUMMARY OF THE INVENTION

It is therefore a primary object of the present invention to provide a bearing cooling structure including a metal base seat and a plastic bearing cup connected with the metal base seat for dissipating the heat of the bearing.

It is a further object of the present invention to provide the above bearing cooling structure in which the metal base seat has a raised section protruding from a center of the metal base seat. The plastic bearing cup encloses the raised section, whereby the plastic bearing cup is fixed on the metal base seat.

It is still a further object of the present invention to provide the above bearing cooling structure in which the plastic bearing cup has an inner circumference defining a bearing hole. The extension section extends toward a center of the bearing hole. The bearing is received in the bearing hole and rested on the extension section. The heat of the bearing can be conducted through the extension section to the metal base seat to be dissipated.

It is still a further object of the present invention to provide the above bearing cooling structure in which the bearing is received in the plastic bearing cup and the heat of the bearing is conducted to a large-area metal substrate to be quickly dissipated.

It is still a further object of the present invention to provide the above bearing cooling structure in which the plastic bearing cup has an inner circumference defining a bearing hole. The extension section of the metal base seat extends from the inner circumference of the plastic bearing cup toward a center of the bearing hole. The bearing is received in the bearing hole and rested on the extension section. The extension section has a free end extending into a retainer groove of a shaft rod. The heat of the bearing can be conducted through the extension section to the metal base seat to be dissipated. In addition, the extension section serves to retain the shaft rod to prevent the shaft rod from detaching from the bearing.

To achieve the above and other objects, the bearing cooling structure of the present invention is applied to a bearing having a bottom face. The bearing cooling structure includes: a metal base seat having a raised section protruding from a center of the metal base seat and an extension section extending from the raised section, the extension section having a free end and an upper surface defined between the free end and a free end of the raised section; and a plastic bearing cup having a bottom section enclosing the raised section. A top end of the plastic bearing cup upward extends from the bottom section. The top end is higher than the raised section. The plastic bearing cup has an inner circumference defining a bearing hole extending from the top end to the bottom section. The extension section extends toward a center of the plastic bearing cup. The free end and the upper surface of the extension section are positioned in the bearing hole. The bearing is received in the bearing hole and disposed on the extension section. The bottom face of the bearing is in contact with the upper surface of the extension section.

The fan of the present invention includes: a metal base seat having a raised section protruding from a center of the metal base seat and an extension section extending from the raised section, the extension section having a free end and an upper surface; a plastic bearing cup having a bottom section enclosing the raised section, whereby the plastic bearing cup is fixed on the metal base seat, a top end of the plastic bearing cup upward extending from the bottom section, the top end being higher than the raised section, the plastic bearing cup having an inner circumference defining a bearing hole extending from the top end to the bottom section; a stator assembly fitted around the plastic bearing cup; a bearing received in the bearing hole, the bearing having a central hole and a bottom face; and a rotor assembly corresponding to the stator assembly. The rotor assembly includes a shaft rod passing through the central hole of the bearing. One end of the shaft rod, which end passes through the bearing, is formed with a retainer groove. The extension section extends toward the center of the plastic bearing cup. The free end and the upper surface of the extension section are positioned in the bearing hole. The bearing is disposed on the extension section with the bottom face of the bearing in contact with the upper surface of the extension section.

In the above fan, the raised section is a hollow tubular section perpendicular to the metal base seat. The extension section horizontally extends from a free end of the raised section toward the center of the hollow tubular section. Inner side of the raised section defines a space under the extension section in communication with the bearing hole. A sealing unit is disposed in the space for sealing the bearing hole.

In the above fan, the bearing has an inner circumference section, an outer circumference section and a bottom face defined between the inner and outer circumference sections. The free end of the extension is aligned with the inner circumference section.

The fan further includes a metal substrate having a first window. The metal base seat has multiple connection members. One end of the connection member is connected with outer circumference of the metal base seat, while the other end of the connection member is connected with an inner circumference of the first window, whereby the metal base seat is supported by the connection members and positioned in the first window. The metal substrate is connected with a frame body surrounding the metal substrate.

BRIEF DESCRIPTION OF THE DRAWINGS

The structure and the technical means adopted by the present invention to achieve the above and other objects can be best understood by referring to the following detailed description of the preferred embodiments and the accompanying drawings, wherein.

DETAILED DESCRIPTION OF THE PREFERRED EMBODIMENTS

Figure 1A:
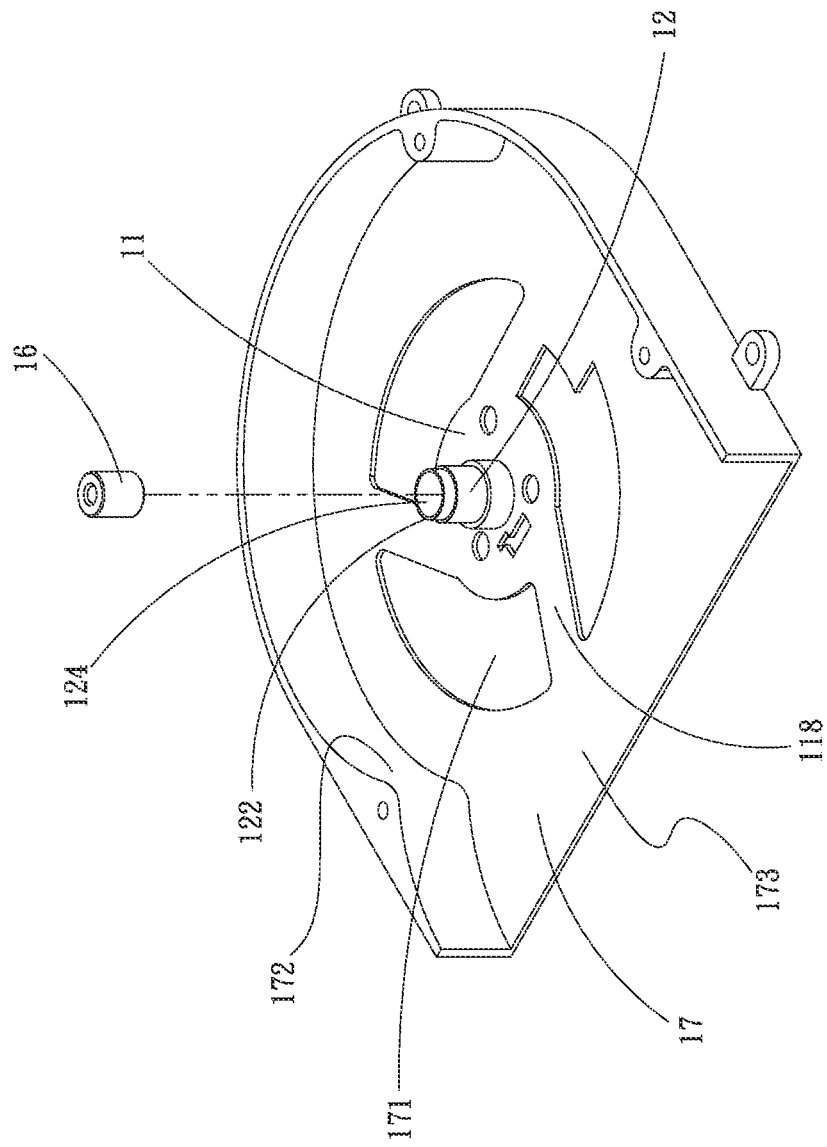
FIG. 1A is a perspective view of the present invention.
Figure 1B:
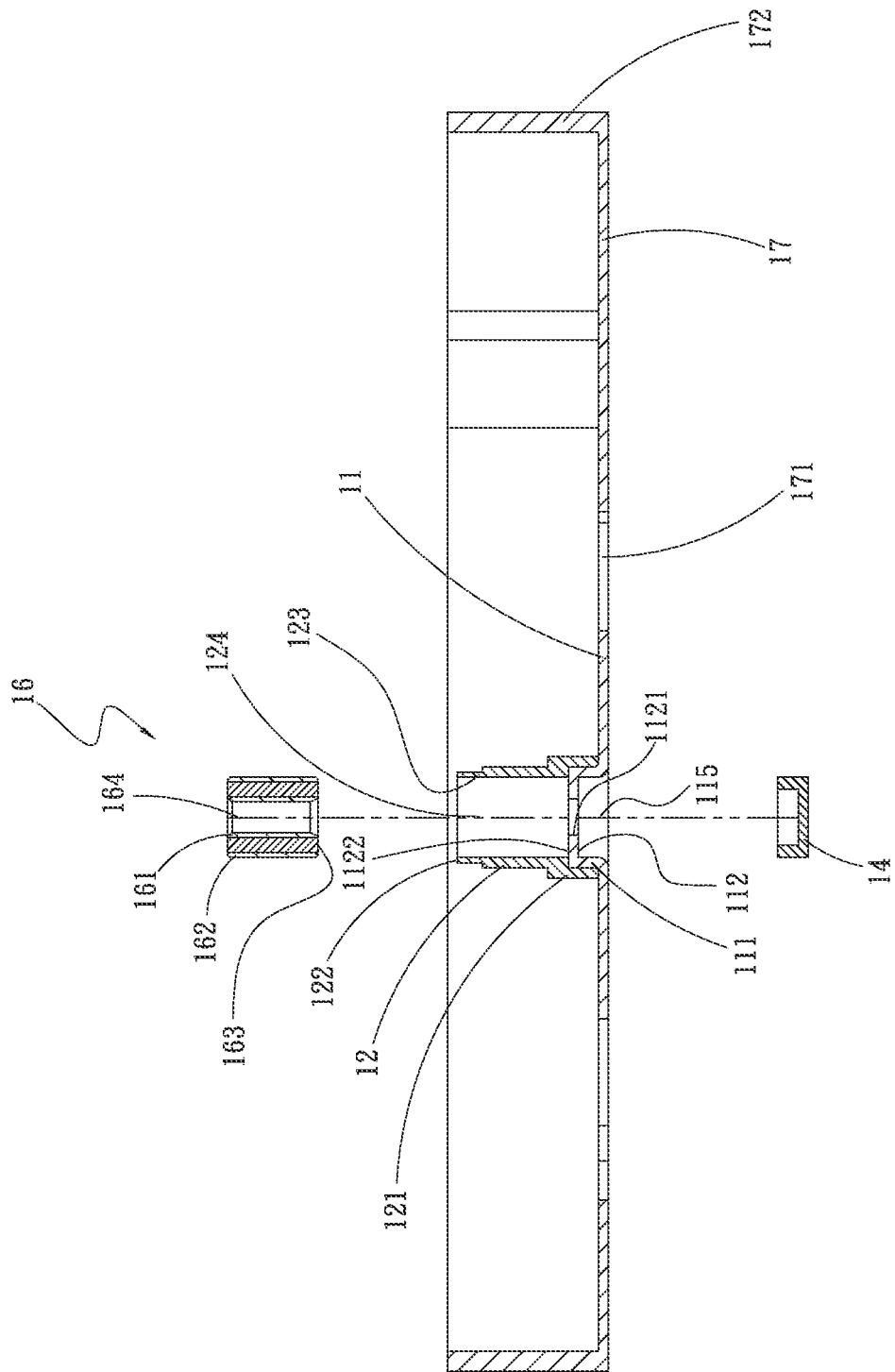
FIG. 1B is a front sectional exploded view of the present invention.
Figure 1C:
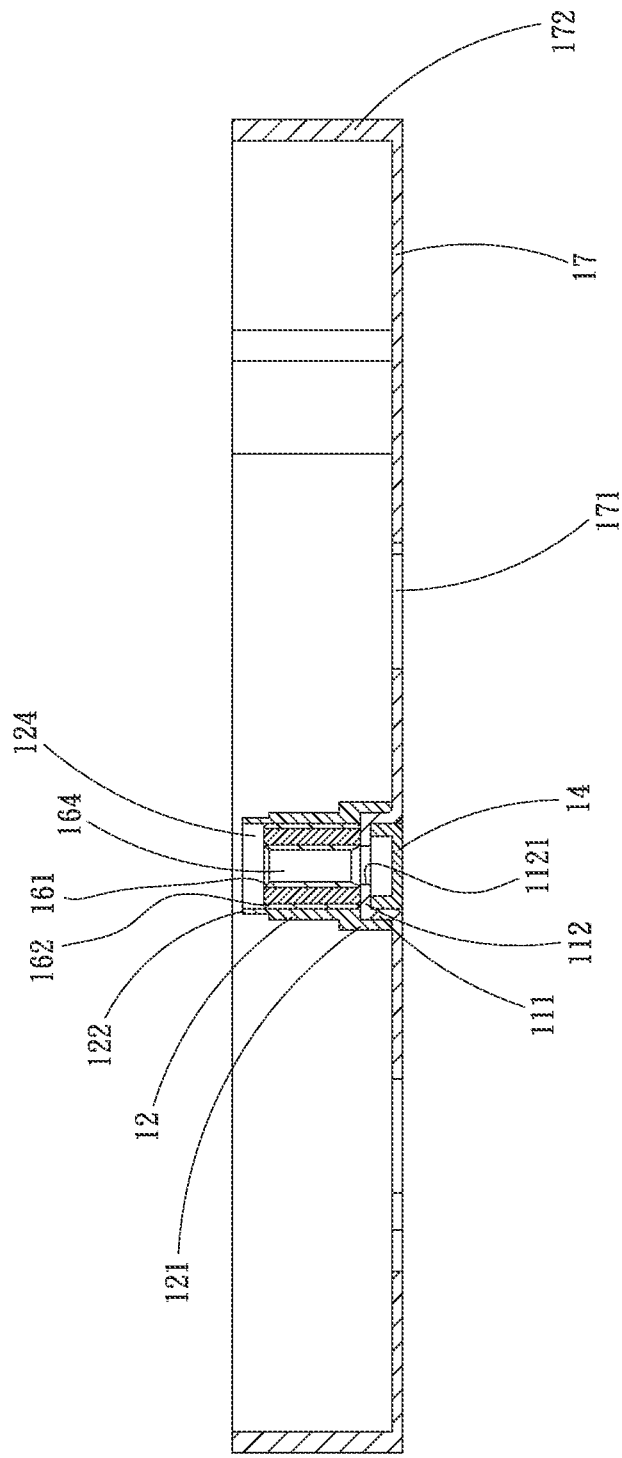
FIG. 1C is a sectional assembled view of the present invention.

Please refer to FIGS. 1A, 1B and 1C. FIG. 1A is a perspective view of the present invention. FIG. 1B is a front sectional exploded view of the present invention. FIG. 1C is a sectional assembled view according to FIG. 1B. According to a preferred embodiment, the present invention includes a metal base seat 11 and a plastic bearing cup 12. The metal base seat 11 has a raised section 111 substantially perpendicularly protruding from a center of the metal base seat 11. An extension section 112 horizontally extends from a free end of the raised section 111.

The plastic bearing cup 12 has a bottom section 121 enclosing the raised section 111, whereby the plastic bearing cup 12 is fixed on the metal base seat 11. A top end 122 upward extends from the bottom section 121. The top end 122 is higher than the raised section 111. The plastic bearing cup 12 has an inner circumference 123 defining a bearing hole 124 extending from the top end 122 to the bottom section 121. In this embodiment, the plastic bearing cup 12 can enclose the raised section by means of injection molding, whereby the plastic bearing cup 12 is fixed on the metal base seat 11.

The extension section 112 has a free end 1121 and an upper surface 1122 defined between the free end 1121 and the free end of the raised section 111. The extension section 112 horizontally extends from the free end of the raised section 111 toward the center of the plastic bearing cup. The free end 1121 and the upper surface 1122 are positioned in the bearing hole 124. Inner side of the raised section 111 defines a space 115 under the extension section 112 in communication with the bearing hole 124. The space 115 is sealed with a sealing unit 14. In this embodiment, the sealing unit 14 is a cap body for correspondingly blocking the space 115 from bottom face of the metal base seat 11. Alternatively, in another embodiment, the sealing unit 14 can be formed in the space 115 from the bottom face of the metal base seat 11 by means of injection molding along with the plastic bearing cup 12.

A bearing 16 is mounted in the bearing hole 124 and rested on the extension section 112. The bearing 16 has an inner circumference section 161, an outer circumference section 162 and a bottom face 163 defined between the inner and outer circumference sections 161, 162. The inner circumference section 161 defines a central hole 164 for fitting a shaft rod therein. The bottom face 163 is in contact with the upper surface 1122 of the extension section 112. In this embodiment, the inner circumference section 161 is aligned with the free end 1121 of the extension section 112. In another embodiment, the free end 1121 slightly protrudes from the inner circumference section 161 into a retainer groove of the shaft rod. This will be further described hereinafter.

A metal substrate 17 has a first window 171. The metal base seat 11 has multiple connection members 118. One end of the connection member 118 is connected with outer circumference of the metal base seat 11, while the other end of the connection member 118 is connected with an inner circumference of the first window 171, whereby the metal base seat 11 is supported by the connection members 118 and positioned in the first window 171. The metal substrate 17 is connected with a frame body 172 surrounding the metal substrate 17. A second window 173 is formed on one side of the metal substrate 17.

In this embodiment, the material of the metal base seat 11 and the metal substrate 17 is selected from a group consisting of gold, silver, copper, aluminum, iron and a combination thereof.

Figure 2A:
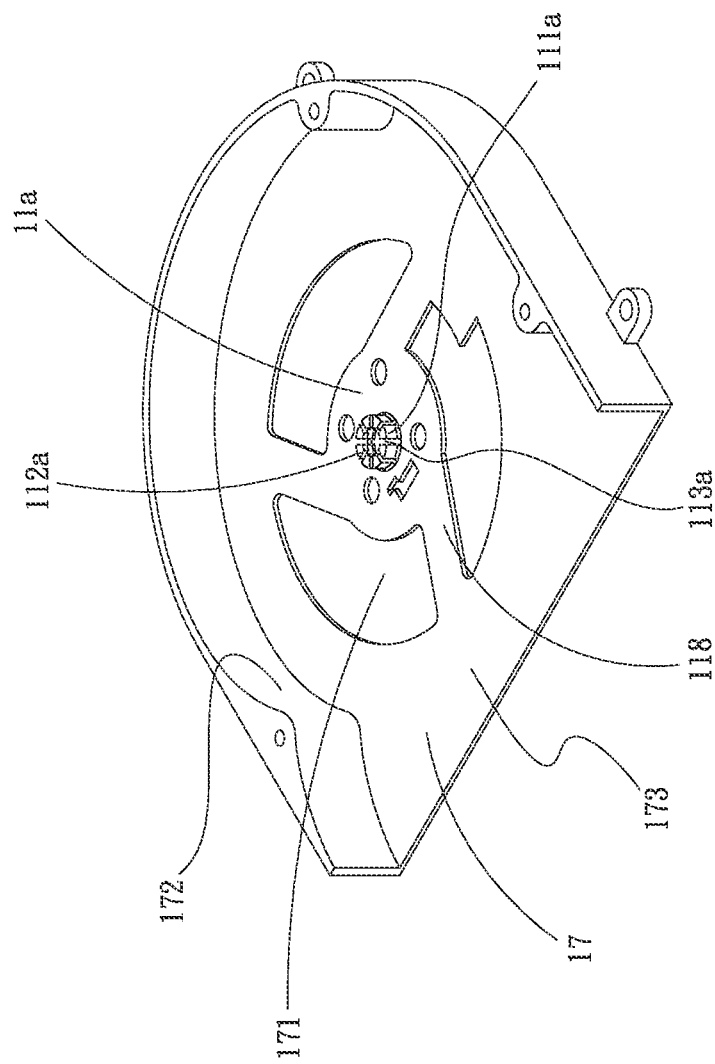
FIG. 2A is a perspective view of another embodiment of the present invention, showing another aspect of the raised section.
Figure 2B:
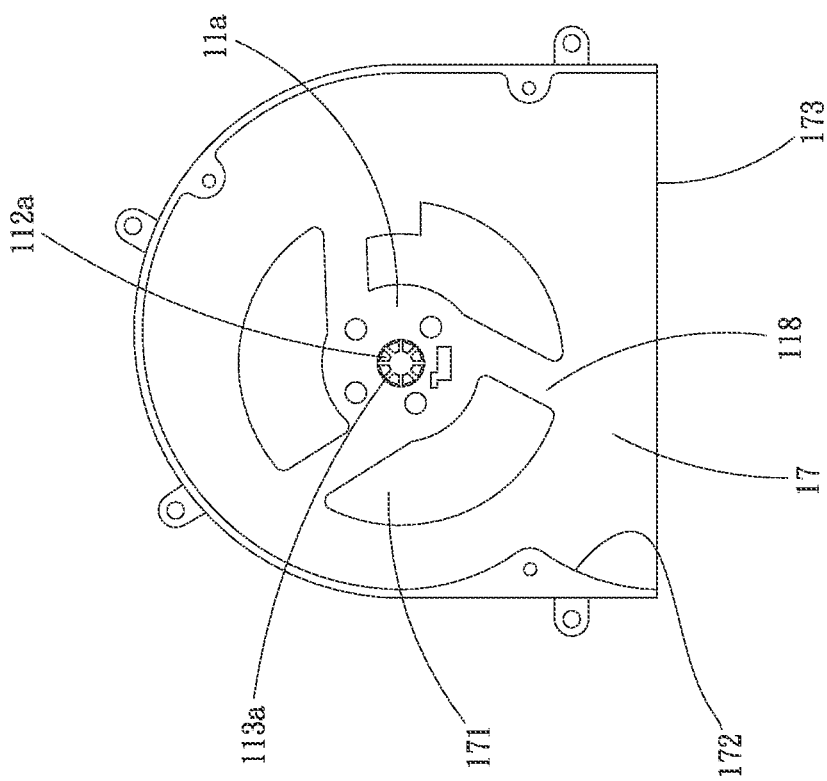
FIG. 2B is a top view according to FIG. 2A.
Figure 2C:
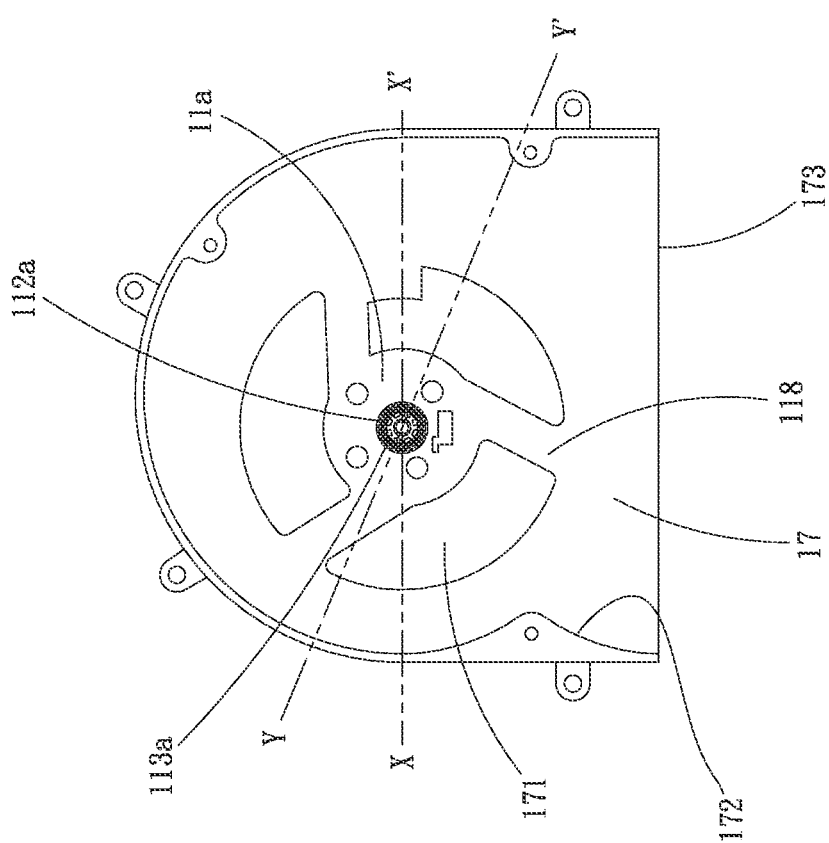
FIG. 2C is a top view according to FIG. 2B, showing that the raised section is enclosed in the plastic bearing cup.
Figure 2D:
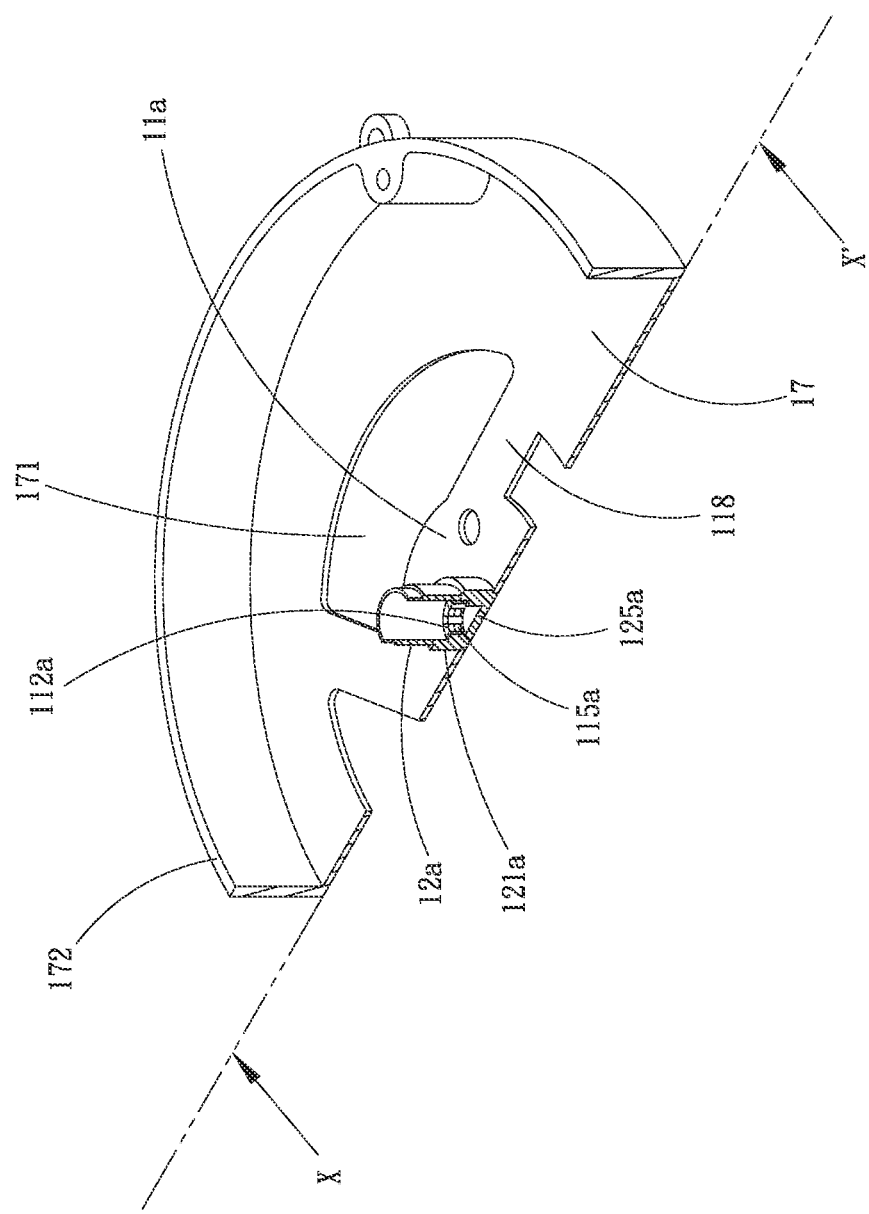
FIG. 2D is a sectional view taken along line X-X' of FIG. 2C.
Figure 2E:
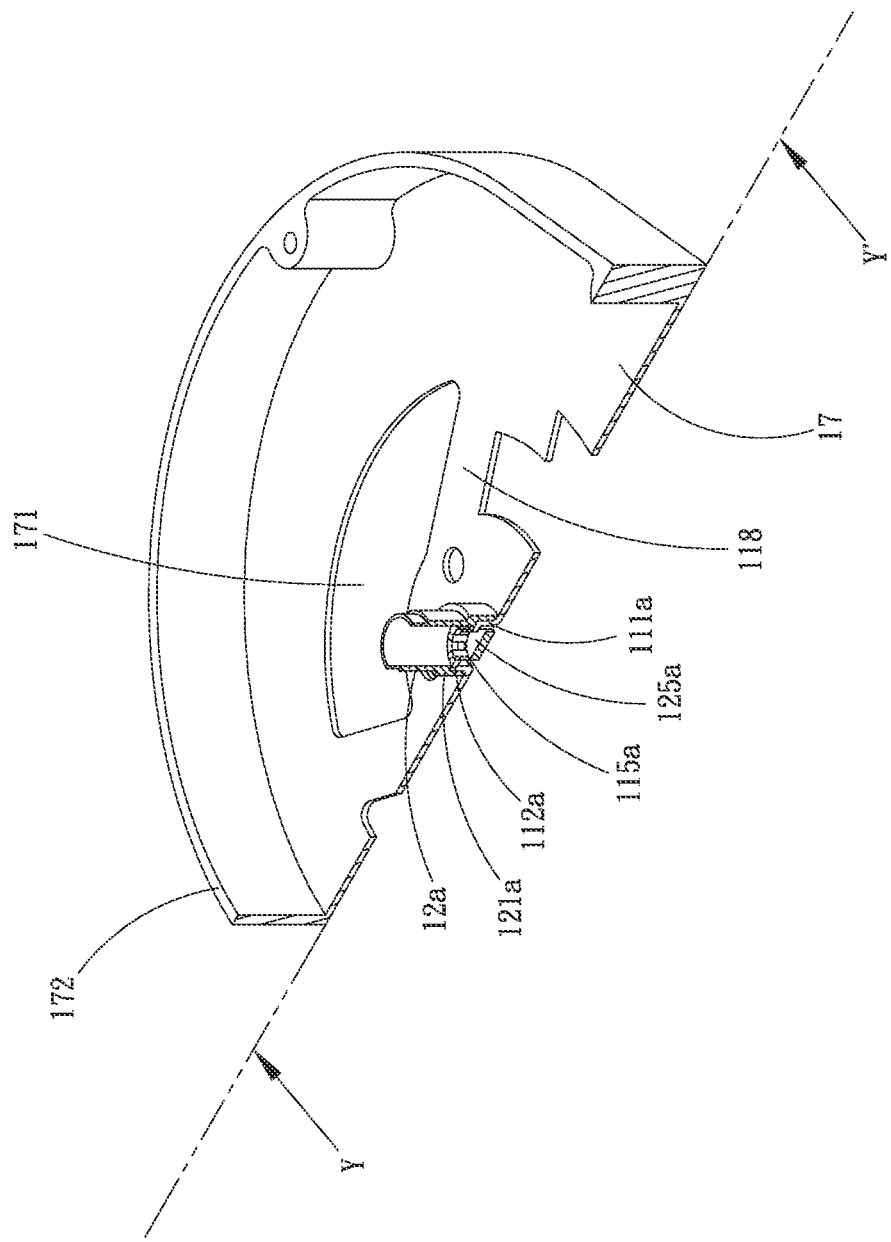
FIG. 2E is a sectional view taken along line Y-Y' of FIG. 2C.

It should be noted that the raised section 111 is substantially a hollow tubular section and the extension section 112 horizontally extends toward the center of the hollow tubular section. FIGS. 2A, 2B, 2C, 2D and 2E show another embodiment of the present invention. FIG. 2A is a perspective view of another embodiment of the present invention, showing another aspect of the raised section. FIG. 2B is a top view according to FIG. 2A. FIG. 2C is a top view according to FIG. 2B, showing that the raised section is enclosed in the plastic bearing cup. FIG. 2D is a sectional view taken along line X-X' of FIG. 2C. FIG. 2E is a sectional view taken along line Y-Y' of FIG. 2C. In this embodiment, the raised section 111a of the metal base seat 11a has multiple splits 113a extending from the raised section 111a to the extension section 112a to divide the raised section 111a and the extension sections 112a into multiple plate bodies. The bottom section 121a of the plastic bearing cup 12a extends through the splits 113a to form a closed end 125a in the space 115a to seal the space 115a.

Figure 3A:
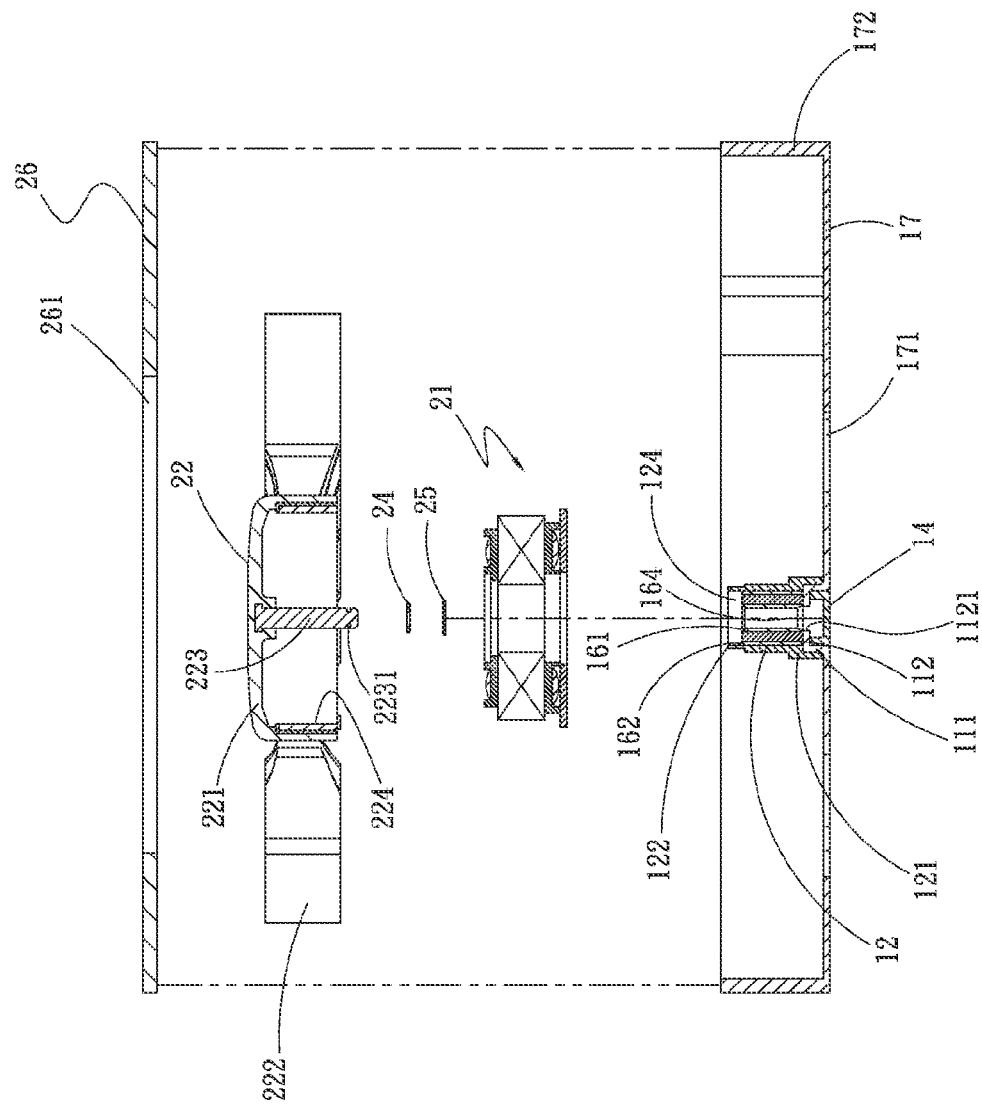
FIG. 3A is a sectional exploded view of the fan of the present invention.
Figure 3B:
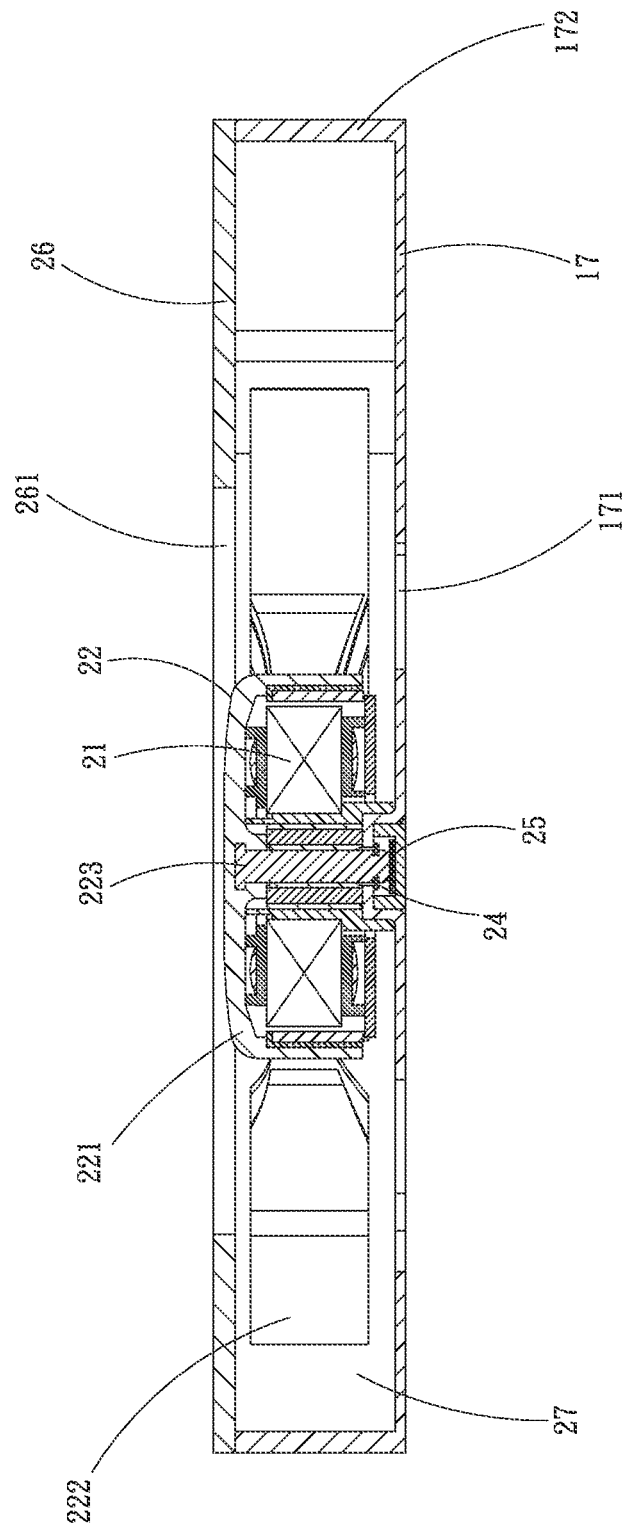
FIG. 3B is a sectional assembled view of the fan of the present invention.

FIG. 3A is a sectional exploded view of the fan of the present invention. FIG. 3B is a sectional assembled view of the fan of the present invention. The same components are denoted with the same reference numerals. The fan 20 further includes a stator assembly 21 and a rotor assembly 22 in addition to the above structure.

The stator assembly 21 is fitted around the plastic bearing cup 12, including multiple silicon steel sheets, insulation support assembly, windings and circuit board.

The rotor assembly 22 corresponds to the stator assembly 21, including a hub 221 and multiple blades 222 annularly disposed around the hub 221. A shaft rod 223 is disposed a center of inner side of the hub 221 to pass through the central hole 164 of the bearing 16. One end of the shaft rod 223, which end passes through the bearing 16, is formed with a retainer groove 2231. A retainer ring 24 is disposed in the retainer groove 2231 for fixing the shaft rod 223. A magnetic member 224 is annularly disposed on inner circumference of the hub 221 corresponding to the stator 21. The rotor assembly 22 can be an axial-flow fan impeller or a centrifugal fan impeller.

A pad member 25 is disposed on the sealing unit 14. The end of the shaft rod 223 passes through the bearing 16 to abut against the pad member 25.

An upper cover 26 having a third window 261 is correspondingly mated with the frame body 172. A receiving space 27 is formed between the upper cover 26, the metal substrate 17 and the frame body 172. The third window 261, the first window 171 and the second window 173 communicate with the receiving space 27.

When the stator assembly 21 is powered on and magnetized, the rotor assembly 22 is driven to rotate. At this time, the inner circumference section 161 of the bearing 16 is rotated along with the shaft rod 223. During the rotation, the heat generated by the bearing 16 is transferred through the extension section 112 to the metal base seat 11 and the metal substrate 17 to be dissipated. Accordingly, the efficiency of the bearing 16 will not be deteriorated due to overheating. Also, the bearing 16 is protected from damage caused by overheating.

Figure 4:
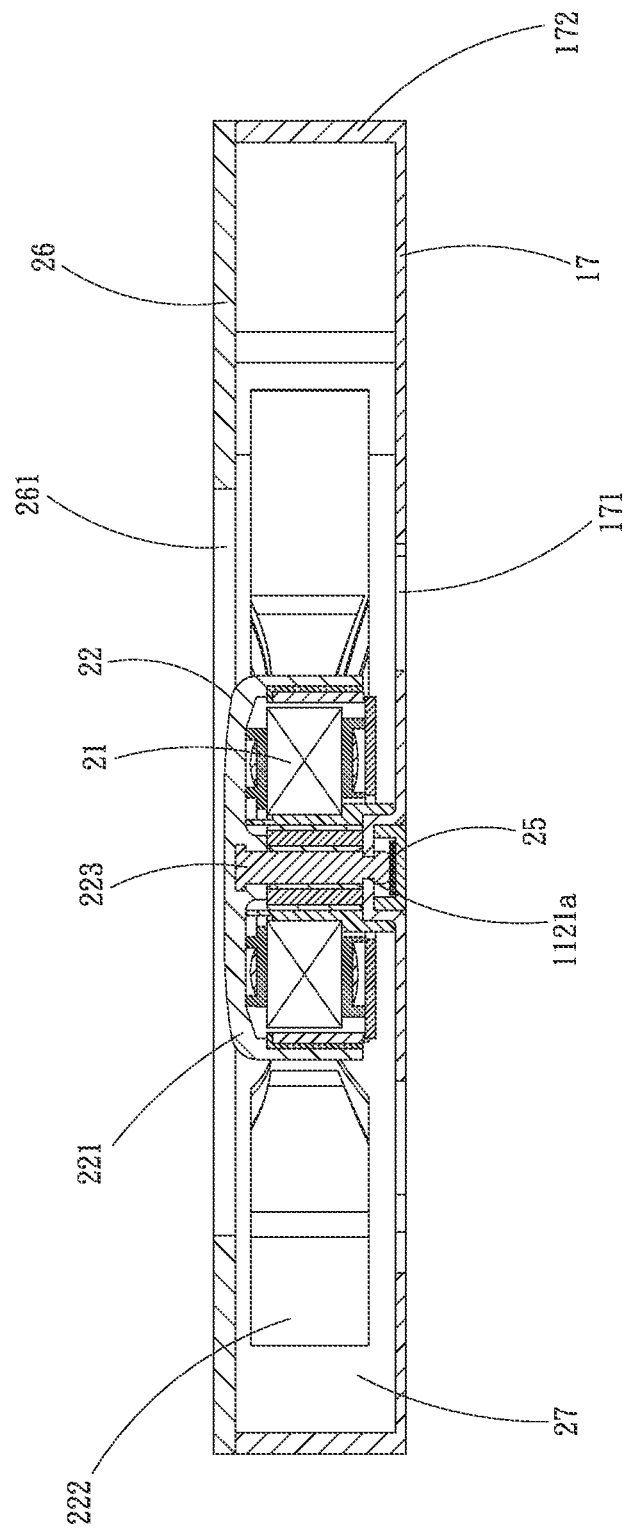
FIG. 4 is a sectional assembled view of another embodiment of the fan of the present invention.

FIG. 4 is a sectional assembled view of another embodiment of the fan of the present invention. In this embodiment, the free end 1121a of the extension section 112 slightly protrudes from the inner circumference section 161 into the retainer groove 2231 of the shaft rod 223 so as to prevent the shaft rod from detaching from the bearing 16 instead of the retainer ring 24. In addition, this helps in dissipating the heat of the bearing 16.

The present invention has been described with the above embodiments thereof and it is understood that many changes and modifications in the above embodiments can be carried out without departing from the scope and the spirit of the invention that is intended to be limited only by the appended claims.

What is claimed is:

1. A bearing cooling structure applied to a bearing having a bottom face, the bearing cooling structure comprising:
    a metal base seat having a raised section protruding from a center of the metal base seat, an extension section extending from an inner surface of the raised section, the raised section and the extension section being parts of a unitary structure, the extension section having a free end and an upper surface; and
    a plastic bearing cup having a bottom section enclosing the raised section, whereby the plastic bearing cup is fixed on the metal base seat, a top end of the plastic bearing cup upward extending from the bottom section, the top end being higher than the raised section, the plastic bearing cup having an inner circumference defining a bearing hole extending from the top end to the bottom section, wherein the extension section extends toward a center of the plastic bearing cup, the free end and the upper surface of the extension section being positioned in the bearing hole, the bearing being received in the bearing hole and disposed on the extension section, the bottom face of the bearing being in direct contact with the upper surface of the extension section, wherein an outer diameter of the raised section is larger than an outer diameter of the bearing;
    wherein the raised section is a hollow tubular section, the extension section extends perpendicularly from a free end of the raised section toward a center of the hollow tubular section, and the upper surface of the extension section, a top surface of the raised section and a bottom surface of the bearing are all coplanar.

2. The bearing cooling structure as claimed in claim 1, wherein the raised section has multiple splits extending from the raised section to the extension section.

3. The bearing cooling structure as claimed in claim 2, wherein the bottom section of the plastic bearing cup extends through the splits to form a closed end in the space to seal the space.

4. The bearing cooling structure as claimed in claim 1, wherein an inner side of the raised section defines a space under the extension section in communication with the bearing hole.

5. The bearing cooling structure as claimed in claim 4, further comprising a sealing unit for sealing the space.

6. The bearing cooling structure as claimed in claim 1, wherein the raised section is perpendicular to the metal base seat.

7. The bearing cooling structure as claimed in claim 1, wherein the bearing has an inner circumference section, an outer circumference section and a bottom face defined between the inner and outer circumference sections.

8. The bearing cooling structure as claimed in claim 7, wherein the free end of the extension section is aligned with the inner circumference section.

9. The bearing cooling structure as claimed in claim 7, wherein the free end of the extension section slightly protrudes from the inner circumference section into a retainer groove of a shaft rod.

10. The bearing cooling structure as claimed in claim 1, further comprising a metal substrate having a first window, the metal base seat having multiple connection members, one end of the connection member being connected with an outer circumference of the metal base seat, while the other end of the connection member being connected with an inner circumference of the first window, wherein the metal base seat is supported by the connection members and positioned in the first window.

11. The bearing cooling structure as claimed in claim 10, wherein the metal substrate is connected with a frame body surrounding the metal substrate, a second window being formed on one side of the metal substrate.

12. The bearing cooling structure as claimed in claim 10, wherein the metal substrate is made of a material selected from a group consisting of gold, silver, copper, aluminum, iron and a combination thereof.

13. The bearing cooling structure as claimed in claim 1, wherein the metal base seat is made of a material selected from a group consisting of gold, silver, copper, aluminum, iron and a combination thereof.

14. A fan comprising:
a metal base seat having a raised section protruding from a center of the metal base seat, an extension section extending from an inner surface of the raised section, the raised section and the extension section being parts of a unitary structure, the extension section having a free end and an upper surface;
a plastic bearing cup having a bottom section enclosing the raised section, whereby the plastic bearing cup is fixed on the metal base seat, a top end of the plastic bearing cup upward extending from the bottom section, the top end being higher than the raised section, the plastic bearing cup having an inner circumference defining a bearing hole extending from the top end to the bottom section;
a stator assembly fitted around the plastic bearing cup;
a bearing received in the bearing hole, the bearing having a central hole and a bottom face; and
a rotor assembly corresponding to the stator assembly, the rotor assembly including a shaft rod passing through the central hole of the bearing, one end of the shaft rod, which end passes through the bearing, being formed with a retainer groove, the extension section extending perpendicularly toward a center of the plastic bearing cup, the free end and the upper surface of the extension section being positioned in the bearing hole, the bearing being disposed on the extension section with the bottom face of the bearing in direct contact with the upper surface of the extension section, wherein an outer diameter of the raised section is larger than an outer diameter of the bearing;
wherein the upper surface of the extension section, a top surface of the raised section and the bottom face of the bearing are all coplanar.

15. The fan as claimed in claim 14, wherein the free end of the extension section extends into the retainer groove of the shaft rod.

16. The fan as claimed in claim 14, wherein the free end of the extension is aligned with an inner circumference section of the bearing.

17. The fan as claimed in claim 14, further comprising a metal substrate having a first window, the metal base seat having multiple connection members, one end of the connection member being connected with outer circumference of the metal base seat, while the other end of the connection member being connected with an inner circumference of the first window, whereby the metal base seat is supported by the connection members and positioned in the first window.

18. The fan as claimed in claim 17, wherein the metal substrate is connected with a frame body surrounding the metal substrate, a second window being formed on one side of the metal substrate.

* * * * *